United States Patent [19]

Louzil

[11] 4,455,560

[45] Jun. 19, 1984

[54] INK JET PRINTING HEAD AND METHOD OF MANUFACTURING SUCH AN INK JET PRINTING HEAD

[76] Inventor: Friedrich Louzil, Breitenseerstrasse 116, 1140 Vienna, Austria

[21] Appl. No.: 323,619

[22] Filed: Nov. 20, 1981

[30] Foreign Application Priority Data

Dec. 15, 1980 [AT] Austria ................................ 6104/80

[51] Int. Cl.[3] ........................................... G01D 15/18

[52] U.S. Cl. ................................ 346/140 R; 346/1.1

[58] Field of Search ...................... 346/1.1, 75, 140 IJ, 346/140 PD

[56] References Cited

U.S. PATENT DOCUMENTS 3,988,745 10/1976 Sultan .......................... 346/140 PD
4,248,823 2/1981 Bader et al. ............ 346/140 PD X

OTHER PUBLICATIONS

Lee, F. et al., Laminated Ink Jet Head, IBM Technical Disclosure Bulletin, Dec. 1980, vol. 23, No. 7A, pp. 2955–2957.

*Primary Examiner*—George H. Miller, Jr.

[57] ABSTRACT

In an ink jet printing head which comprises several nozzles (18), each of which having associated with it an essentially oppositely situated pressure chamber (2), there are provided at least two supporting sections (1,7) which are linked in a stack-like manner opposite the nozzles and on which the pressure chambers are distributed in a staggered manner. The jet nozzle ducts (6) which emerge from the pressure chambers on the supporting section (7) remote from the nozzles and which lead to the nozzles are guided between the pressure chambers on the supporting section (1) which is nearer with respect to the nozzles (FIG. 6).

According to a method of manufacturing such an ink jet printing head, first the supporting sections (1,7) with the pressure chambers (2) are individually finished after which they are linked in a stack-like manner and provided in a mould with an adapter piece (15) in which the nozzle ducts (6) emerging from the pressure chambers continue into further nozzle ducts (28) leading to the nozzles (18) (FIG. 6).

4 Claims, 10 Drawing Figures

INK JET PRINTING HEAD AND METHOD OF MANUFACTURING SUCH AN INK JET PRINTING HEAD

The invention relates to an ink jet printing head which comprises at least one supporting section for a number of pressure chambers which communicate with an ink duct via supply ducts and the principal dimension of the base of which is substantially larger than their height, the pressure chambers being adjacently arranged in the supporting section, a jet nozzle duct emerging from each pressure chamber in order to supply ink to a nozzle which is situated opposite the pressure chambers.

An ink jet printing head of this kind is described, for example, in German Offenlegungsschrift No. 2808275. If an ink jet printing head of this kind requires a large number of pressure chambers, for example, 12 or 24, problems arise as regards the space for arranging the pressure chambers near a side face of the carrier section, because the principal dimension of the base of the individual pressure chambers is comparatively large whilst the space for the same number of nozzles which are situated opposite the pressure chambers is comparatively small, because they have only very small dimensions and must be arranged very near to one another. In order to solve this problem, it has already been proposed in U.S. Pat. No. 4,115,789 to reduce the number of pressure chambers required with respect to the number of nozzles required by the assignment of a combination of two pressure chambers to each nozzle, a nozzle then ejecting an ink droplet only when the corresponding two pressure chambers are simultaneously activated. Even though the number of pressure chambers required is thus reduced, a much more complex system of jet nozzle ducts which interconnect the pressure chambers and the nozzles is then required. The construction of such an ink jet printing head thus becomes comparatively complex and the certainty that an ink droplet will be ejected from a nozzle at exactly the correct instant is also reduced. In U.S. Pat. No. 4,115,789 it is also proposed to distribute the number of pressure chambers between two oppositely situated side faces of the ink jet printing head, the nozzles being arranged on a third side face which extends transversely of the former two side faces. However, this implies jet nozzle ducts which extend at an angle from the pressure chambers to the nozzles, which means that a comparatively large amount of energy is required for activating the pressure chambers in order to put the corresponding quantity of ink into motion. An arrangement of the nozzles and the pressure chambers which is shown in said German Offenlegungsschrift No. 28 08 275 and which underlies the type of ink jet printing head in accordance with the invention has often been found to be more attractive, even though said problem as regards the arrangement of the pressure chambers still exists.

The invention has for its object to form an ink jet printing head of the kind set forth so that even a large number of pressure chambers can be arranged in a particularly compact manner, the pressure chambers being situated opposite the nozzles in a registering manner as well as possible in order to minimize the amount of energy required for the activation of the pressure chambers. To this end, an ink jet printing head in accordance with the invention is characterized in that there are provided at least two stacked supporting sections on which the pressure chambers are distributed so that they are staggered with espect to one another, the jet nozzle ducts which emerge from pressure chambers in the suporting section which is remote from the nozzles, viewed in the stacking direction, extending between the pressure chambers in the supporting section which is nearer to the nozzles, viewed in the stacking direction. The number of pressure chambers is thus distributed between planes which are situated one behind the other as if it were, each plane being situated opposite the nozzle. By correct arrangement or interleaving of the pressure chambers in the successive planes, a very high packing density can be obtained for the total assembly of pressure chambers. However, this means that the pressure chambers can be arranged better opposite the nozzles which require only very little space, so that a favourable course can be obtained for the jet nozzle duct which connect the jet nozzles to the pressure chambers. This is because the shape of each of these jet nozzle ducts can be optimized and all jet nozzle ducts can be made to have a substantially uniform shape, so that a suitably uniform supply of ink is obtained for all nozzles.

It has been found that the supporting sections are preferably plate-shaped and that the supporting section which is nearest to the nozzle is preferably adjoined by an adapter piece which extends in the direction of the nozzle and in which the jet nozzle ducts emerging from all pressure chambers are continued as further jet nozzle ducts which lead to the nozzles. A particularly simple construction is thus obtained. In this respect it has been found that on the supporting section which is remote from the nozzles, viewed in the stacking direction, there is preferably provided, corresponding to each pressure chamber and the jet nozzle duct emerging therefrom, a projecting extension piece which accommodates the relevant jet nozzle duct and which extends through a bore which is provided in the supporting section which is nearer to the jet nozzles, said extension piece reaching as far as the adapter piece. It is thus achieved that the jet nozzle ducts of each supporting section are guided directly to the adapter piece so that no sealing problems exist between the separate supporting sections.

The invention also relates to a method of manufacturing an ink jet printing head in accordance with the invention. In this respect, it is an object of the invention to provide a method whereby such an ink jet printing head can be simply manufactured, also in a reproducible manner in bulk. To this end, the method in accordance with the invention is characterized in that the finished supporting sections with the pressure chambers and the jet nozzle ducts emerging therefrom are placed in the stacked position in which they are subsequently arranged in a mould, the remaining clearance therein defining the shape of an adapter piece, after which one end of a wire-shaped or pin-shaped insert is introduced into each of the jet nozzle ducts emerging from the supporting sections, after which the other ends of the inserts extending through the clearance of the mould are fixed on the mould in the positions which correspond to the adjacently situated nozzles, the mould then being filled with a moulding compound and the inserts being removed after the setting of the compound. The manufacture of the supporting sections with the pressure chambers is thus separated from the manufacture of an adapter piece with the further jet nozzle ducts, so that the manufacturing process as a whole is simpler and very well reproducible. During the manufacture of the adapter piece, the supporting sections can also be joined by the moulding compound. It is to be noted that it is known per se to manufacture an ink jet printing head as an assembly in a mould, for example, from German Offenlegungsschrift No. 28 08 275. Such a mould, however, is very complex, because it must contain the pressure chambers as well as the jet nozzle ducts. The described method in accordance with the invention, however, is more attractive because the overall method is simplified by the subdivision into different steps.

The invention will be described in detail hereinafter with reference to the drawings which show some embodiments.

Figure 1:
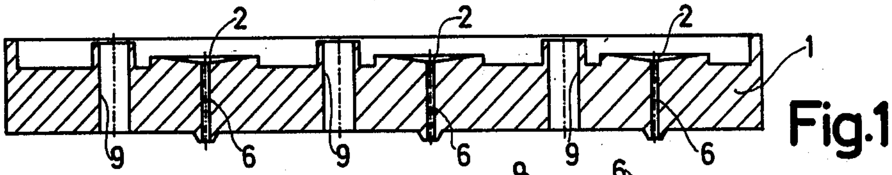
FIG. 1 is a sectional view of a first supporting section with pressure chambers and jet nozzle ducts.
Figure 3:
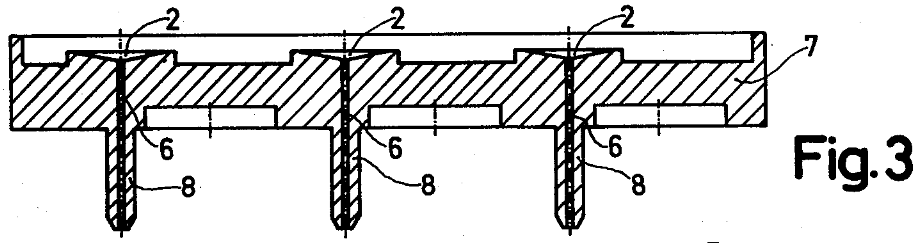
Figure 4:
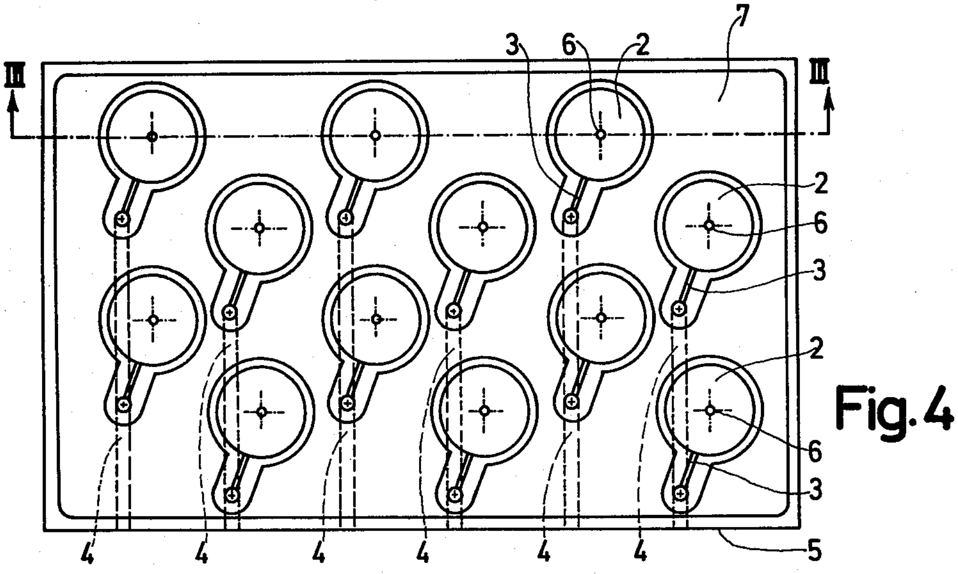
Figure 5:
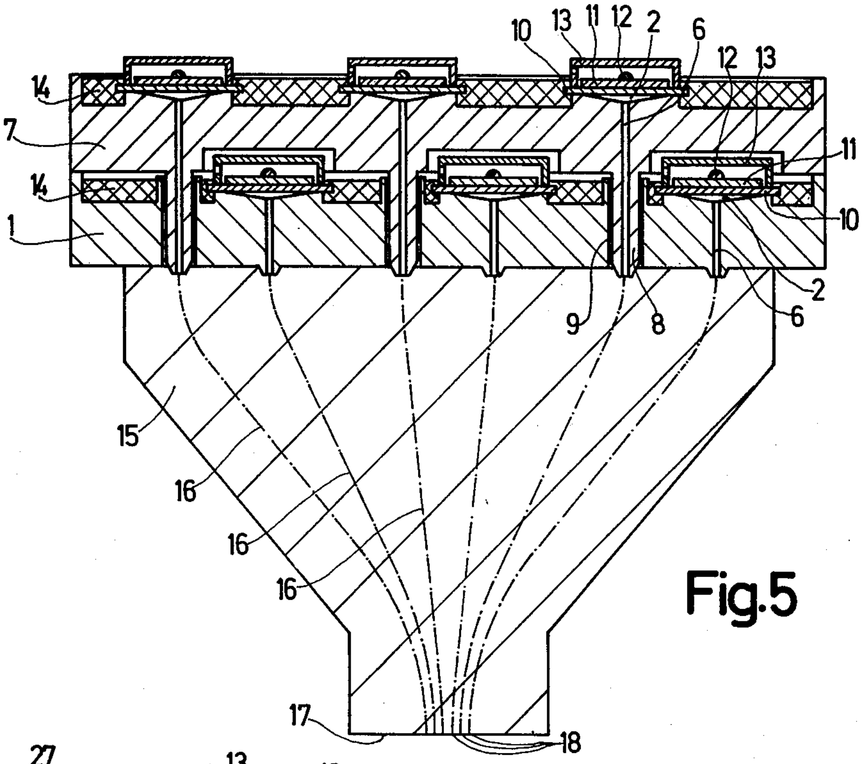
Figure 6:
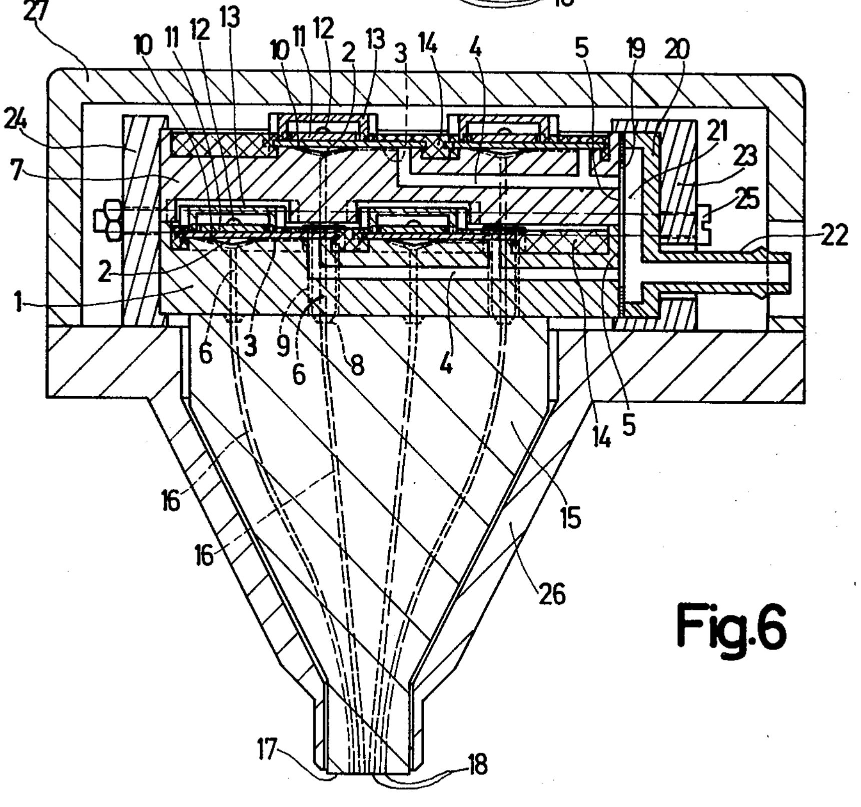
Figure 7:
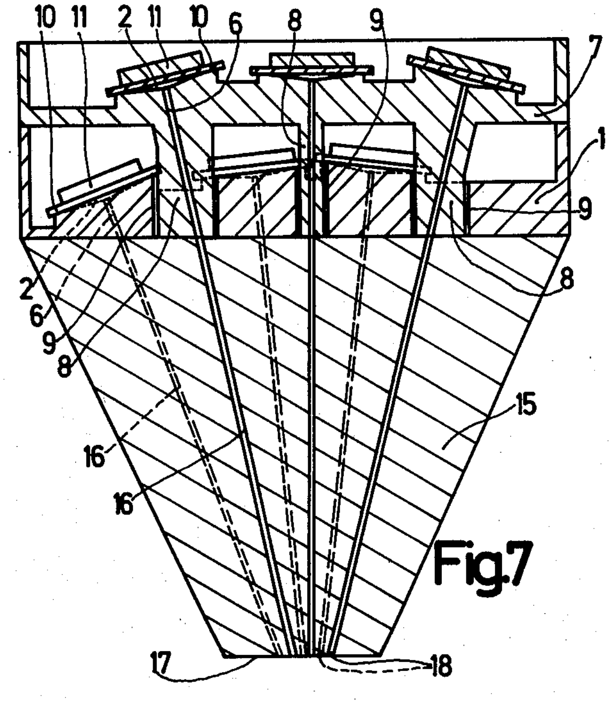
Figure 8:
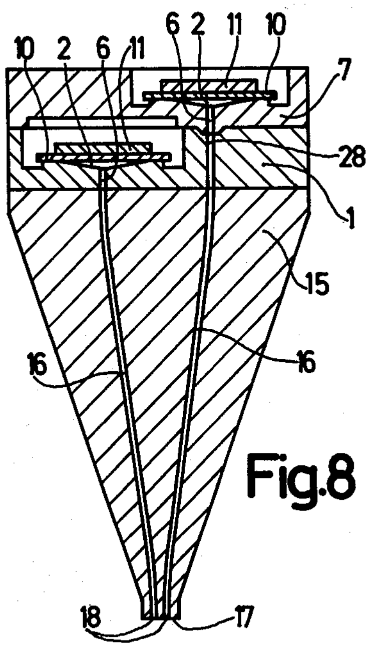
Figure 9:
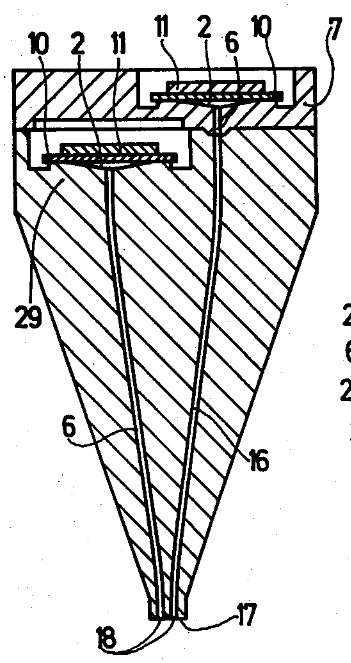
Figure 10:
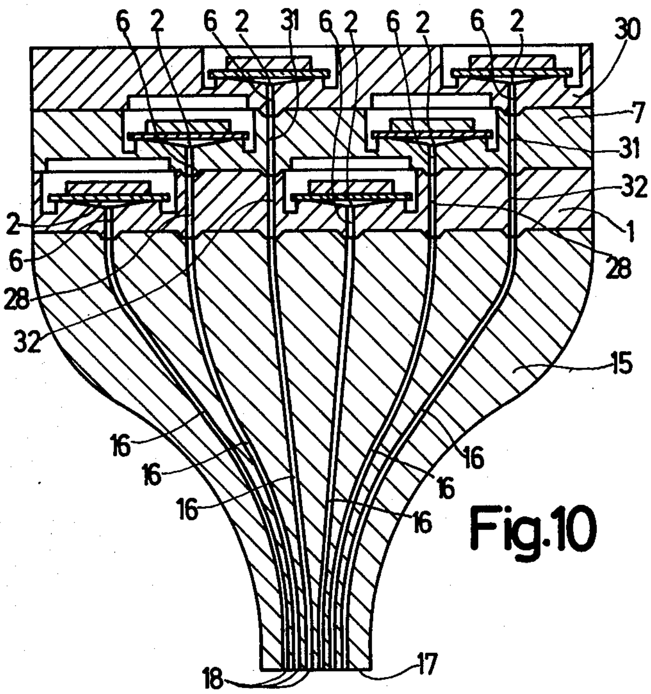

FIG. 3 is a sectional view of a second supporting section with pressure chambers and jet nozzle ducts, FIG. 4 is a plan view of the supporting section shown in FIG. 3, FIG. 5 shows the supporting sections of the FIGS. 1 and 3 in the stacked position, an adapter piece also being shown, FIG. 6 shows a finished ink jet printing head as shown in FIG. 5 in a sectional view which includes the ink supply ducts, FIG. 7 shows an ink jet printing head with straight jet nozzle ducts, FIG. 8 shows an ink jet printing head in which the supporting section which is situated nearer to the nozzles comprises further jet nozzle ducts which adjoin the jet nozzle ducts of the remote supporting section, FIG. 9 shows an ink jet printing head in which one supporting section is constructed to form one integral unit with an adapter piece, and FIG. 10 shows an ink jet printing head comprising three stacked supporting sections.

Figure 2:
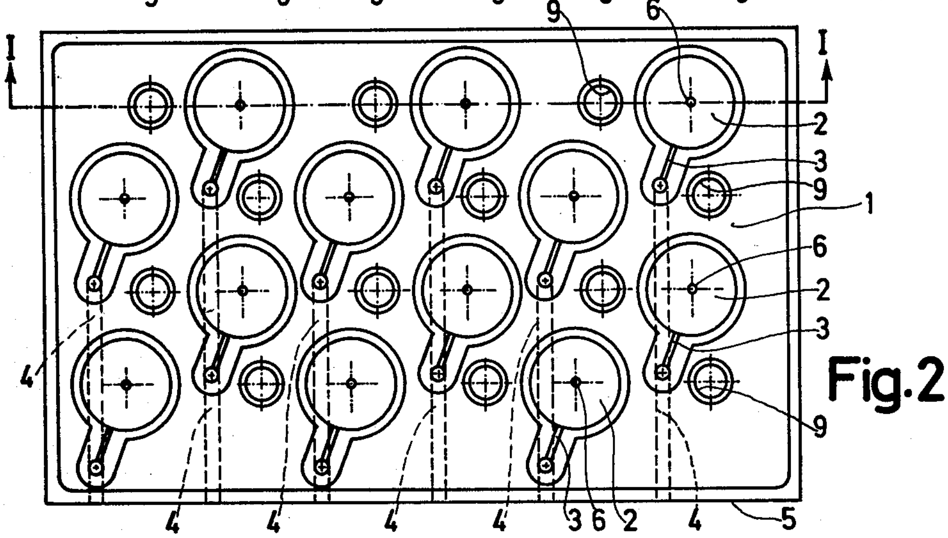
FIG. 2 is a plan view of the supporting section shown in FIG. 1.

A first embodiment of an ink jet printing head in accordance with the invention and a manufacturing method therefore in accordance with the invention will be described with reference to the FIGS. 1 to 6. The reference numeral 1 in the FIGS. 1 and 2 denotes a first plate-shaped supporting section for a number of pressure chambers 2, i.e. twelve pressure chambers in this case. Each of the pressure chambers 2 has a conical shape, the principal dimension of the base of a pressure chamber being substantially larger than its height, so that actually a very flat cone is concerned. The pressure chambers could also have a different shape, for example, a cylindrical shape or a combined cylindrical and conical shape. FIG. 2 shows that the individual pressure chambers are distributed across a principal surface of the plate-shaped supporting section 1, that is to say in four rows of three pressure chambers each, the rows of pressure chambers being staggered with respect to one another so that a regularly interleaved pattern is obtained. Each of the pressure chambers 2 communicates, via a supply duct 3, with an ink supply duct 4 for supplying ink to the pressure chambers. FIG. 2 also shows that each time two pressure chambers are connected to an associated ink supply duct 4 via their supply ducts 3. The ink supply ducts 4 extend within the supporting section 1 and open into a narrow side 5 thereof whereto a common ink supply device for all ink supply ducts is connected, as will be described hereinafter. From each pressure chamber 2 there emerges a customary jet nozzle duct 6 which passes through the supporting section 1 and which supplies ink to a nozzle of the ink jet printing head which is situated opposite the pressure chamber and which is not visible in the FIGS. 1 and 2. A supporting section of this kind can be advantageously manufactured of a plastics material as one unit.

FIGS. 3 and 4 show a second plate-shaped supporting section 7 whose construction is similar to the supporting section 1 of the FIGS. 1 and 2 as regards the shaping and location of the pressure chambers, the jet nozzle ducts, the supply ducts and the ink supply ducts. The supporting section 7 thus comprises twelve pressure chambers 2 which are connected to ink supply ducts 4 via supply ducts 3. The pressure chambers 2, are arranged on the supporting section 7, however, so that they are staggered with respect to the pressure chambers 2 on the supporting section 1 as appears from a comparison of the FIGS. 2 and 4. From each pressure chamber 2 on the supporting section 7 there again emerges a jet nozzle duct 6 which passes through the supporting section 7. Corresponding to each pressure chamber 2 and the jet nozzle duct 6 emerging therefrom, projecting extension pieces 8 are formed on the supporting section 7, each extension piece accommodating one of the jet nozzle ducts 6. Corresponding to the extension pieces 8 on the supporting section 7, bores 9 are provided in the supporting section 1, said bores extending between the pressure chambers 2 on the supporting section 1 due to the fact that the pressure chambers 2 on the supporting section 7 are staggered with respect to those on the supporting section 1.

As a result of the described construction of the supporting sections 1 and 7, they can be stacked; the supporting section 7 is stacked on the supporting section 1, the extension pieces 8 on the supporting section 7 projecting through the bores 9 in the supporting section 1, so that the free ends of the jet nozzle ducts 6 in the supporting section 1 and those of the supporting section 7 are situated mainly in one plane, as appears from FIG. 5 which is a sectional view of the supporting sections 1 and 2, taken along the lines I—I and III—III in the FIGS. 2 and 4, respectively. However, prior to the formation of the stack, each of the supporting sections 1 and 7 is finished to such an extent that the pressure chambers 2 are operational. To this end, each of the pressure chambers 2 is covered by a conductive diaphragm 10 which is connected to an electric lead and which supports a piezoelectric oscillator 11 on its side opposite the pressure chamber, said oscillator itself being connected to a further electric lead via a contact 12. Via the electric leads (not shown), a control device can supply electric pulses to the oscillator in order to deflect the diaphragm and hence change the volume of the pressure chamber so that ink is forced into the jet nozzle duct 6. On the diaphragm 10 there is arranged a cap 13 wherethrough said electric leads are passed. After the finishing of all pressure chambers of the relevant supporting section in this manner, the diaphragms 10 and the caps 13 are united with the supporting section to form one unit by gluing or moulding. The relevant adhesive or moulding compound is denoted by the reference numeral 14 in FIG. 5.

As can be seen, thanks to the stacking of the supporting sections 1 and 7 and the distribution of the pressure chambers 2 between the two supporting sections in a staggered manner with respect to one another a very high packing density of the pressure chambers is achieved, so that the pressure chambers situated opposite the nozzles are collected on an as small as possible surface area.

The ink jet printing head is then finished so that the supporting sections 1 and 7 which have been finished and placed in the stacked position in accordance with FIG. 5 are arranged in a mould in which the clearance defines the shape of an adapter piece in which the jet nozzle ducts 6 emerging from all pressure chambers 2 and further jet nozzle ducts which lead to the nozzles are continued. An adapter piece of this kind is diagrammatically shown and denoted by the reference numeral 15 in FIG. 5. After the insertion of the supporting sections 1 and 7, a mould which is not shown in detail herein should also comprise a clearance which corresponds to the circumference of the adapter piece 15. For the manufacture of the adapter piece with the further jet nozzle ducts, one end of a wire-shaped or pin-shaped insert is inserted into the jet nozzle ducts 6 which open from the supporting sections 1 and 7, after which the other ends of the inserts extending through the clearance of the mould are fixed in the positions on the mould which correspond to the adjacently arranged jet nozzles. Each of the inserts thus connects a jet nozzle duct 6 emerging from a pressure chamber 2 to the position of a later jet nozzle. By choosing the elasticity of the material of the inserts or the method of positioning, a given course can be imparted to the later further jet nozzle ducts. When use is made of rigid pins or taut wires, for example, accurately straight jet nozzle ducts are obtained. However, if the inserts have given resilient properties, slightly undulated shapes are obtained for the further jet nozzle ducts when the inserts are not straight or taut (denoted by stroke-dot lines 16 in FIG. 5). After the positioning of the inserts in the mould, it is filled with a moulding compound, the inserts being removed again after the setting thereof. In the adapter piece 15 there are thus formed the diagrammatically denoted further jet nozzle ducts 16 which open into the nozzles 18 on the side face 17 of the adapter piece 15. Because the inserts are introduced into the jet nozzle ducts 6, the further jet nozzle ducts 16 in the adapter piece 15 directly adjoin the relevant jet nozzle duct 6 in the supporting sections 1 and 7, so that the jet nozzle duct 6 cannot be clogged when the moulding compound is introduced into the mould. Stop shoulders at the transition between the jet nozzle duct 6 and the further jet nozzle ducts 16 are thus also avoided.

Because the extension pieces 8 on the supporting section 7 extend through the supporting section 1 in this embodiment, they also come into contact with the moulding compound forming the adapter piece 15, so that at the same time the two supporting sections 1 and 7 are interconnected. This can even be improved by introducing some clearance between the extension pieces 8 and the bores 9, so that moulding compound can also penetrate between the extension pieces 8 and the walls of the bores 9. The supporting sections 1 and 7 and the adapter piece 15 thus form a firmly unied unit. The jet nozzle ducts 16 opening into the side face 17 of the adapter piece 15 may, for example, directly form the jet nozzles 18. However, it is alternatively possible to arrange on the side face 17 a separate jet nozzle plate which comprises corresponding bores which adjoin the jet nozzle ducts 16 and which form the actual nozzles.

As is shown in FIG. 6, in order to complete the ink jet printing head, on the narrow sides 5 of the supporting sections 1 and 7, in which the ink supply ducts 4 open, a lid-like section 20 is flanged on with an intermediate seal 19, the inner walls of said section 20 extending at a distance from the walls of the narrow sides 5 of the supporting sections 1 and 7, thus forming a hollow space 21 in which all ink supply ducts 4 open in order to be supplied with ink therefrom. For the supply of ink to the hollow space 21, the section 20 comprises a tubular nozzle 22 whereto, for example, a flexible ink duct from an ink reservoir can be connected. The section 20 can be connected to the supporting sections 1 and 7, for example, by way of jaws 23 and 24 and a screwed connection 25. The entire unit can be accommodated in a housing 26 with a cover 27 for the purpose of protection. The leads to the diaphragms 10 and the piezoelectric oscillators 11 are preferably collected in a connector (not shown here) which is arranged on the housing 26.

It appears from the foregoing that an ink jet printing head of this kind has a simple construction and can be simply manufactured, notably because the supporting sections 1 and 7 for the pressure chambers 2 are prefabricated after which they are united with an adapter piece 15 for the further jet nozzle ducts 16. It is also advantageous in this respect that the supporting sections 1 and 7 can be constructed as simple plastics parts and that the adapter piece 15 is formed in one moulding operation, the jet nozzle ducts 6 emerging from the pressure chambers 2 directly changing over into the further jet nozzle ducts 16 in the adapter piece 15 without stop shoulders.

Due to the compact arrangement of the pressure chambers 2, it is achieved that they are situated on a comparatively small area opposite the jet nozzles 18. Consequently, the further jet nozzle ducts 16 which connect the jet nozzle ducts 6 emerging from the pressure chambers 2 to the nozzles 18 may be situated nearer to one another and may be formed to be straight to a high degree and may also have substantially the same length. This is of decisive importance for proper operation of such an ink jet printing head, because the supply of ink to the nozzles from the pressure chambers must be very uniform. Thanks to the oppositely situated pressure chambers 2 and nozzles 18 and the substantially straight interconnecting further jet nozzle ducts 16, only a comparatively small amount of energy is required to activate the pressure chambers via the piezoelectric oscillators. The substantially uniform construction of all further jet nozzle ducts 16 also ensures very uniform and correct ejection of ink droplets from all nozzles at the actuation instants of the pressure chambers. All this is very important for the accurate formation of the characters by the ink jet printing head. The mutual positions of the nozzles can be chosen as desired, for example, in the form of a matrix or simply a row, depending on how a character to be formed is to be composed from the separate dot elements.

The embodiment shown in FIG. 7 again comprises stacked supporting sections 1 and 7 and an adapter piece 15 which comprises the further jet nozzle ducts 16. Again a high packing density of the pressure chambers is achieved, so that they are assembled on a small area opposite the jet nozzles. It is again attempted to obtain absolutely straight jet nozzle ducts 6 and further jet nozzle ducts 16 from the pressure chambers 2 to the jet nozzles 18. This is achieved in that the pressure chambers 2 distributed between the supporting sections 1 and 7 are provided on different oblique faces in the supporting sections 1 and 7. The position of the relevant faces each time depends on which pressure chamber 2 is to be connected to which nozzle 18. As can be seen, the jet nozzle ducts 6 emerging from the pressure chambers 2 and the adjoining further jet nozzle ducts 16 are each time completely straight, so that the supply of ink from the pressure chambers 2 to the nozzles 18 on the side face 17 of the adapter piece 15 is particularly uniform and the piezoelectric oscillators which again influence the pressure chambers via a diaphragm 10 can be driven with a very low energy consumption. On the supporting section 7 there is again provided a projecting extension piece 8 which corresponds to each pressure chamber 2 and to the jet nozzle duct 6 emerging therefrom and which passes through a bore 9 which is provided in the supporting section 1 and which reaches as far as the adapter piece 15. An ink jet printing head of this kind can be manufactured by means of the already described method.

The ink jet printing head which is diagrammatically shown in FIG. 8 also comprises two supporting sections 1 and 7 and an adapter piece 15. On each of the supporting sections 1 and 7 there is provided a row of consecutively arranged pressure chambers 2, the staggered or overlapping arrangement of the pressure chambers again resulting in a high packing density. Obviously, it would also be possible to shift the two arrays of pressure chambers with respect to one another in order to achieve an even higher packing density. In this embodiment, the jet nozzle ducts 6 which emerge from the pressure chambers 2 which are situated on the supporting section 7 which is remote from the nozzles, viewed in the stacking direction, are continued into further jet nozzle ducts 28 which are situated on the near supporting section 1. The further jet nozzle ducts 28 are formed by corresponding bores in the supporting section 1 which extend beyond the pressure chambers 2 provided on this supporting section. The connection between the jet nozzle ducts 6 in supporting section 7 and the further jet nozzle ducts 28 in the supporting section 1 is established when the supporting section 7 is stacked on the supporting section 1, corresponding fits or intermediate sealing rings providing the sealing at the transitions, so that no ink can escape. The adapter piece 15 again comprises further jet nozzle ducts 16 which are connected on the one side to the jet nozzle ducts 6 emerging from the pressure chambers 2 arranged on the supporting section 1 and on the other side to the further jet nozzle ducts 28 provided in the supporting section 1, the further jet nozzle ducts 28 themselves communicating, as has already been stated, with the jet nozzle ducts 6 which emerge from the pressure chambers 2 provided on the supporting section 7. The adapter piece 15 with the jet nozzle ducts 16 can again be manufactured in one moulding operation.

The ink jet printing head shown in FIG. 9 has a construction which is similar to that of the embodiment shown in FIG. 8. However, the supporting section 29 which is situated nearest to the nozzles 18 is now integral with an adapter piece in which the jet nozzle ducts 16 which lead to the nozzles 18 are formed, this section being manufactured as an integral unit, for example, in one moulding operation. As appears from FIG. 9, in this supporting section 29 there are provided a row of consecutively arranged pressure chambers 2 wherefrom the corresponding jet nozzle ducts 6 emerge which lead directly to the nozzles 18 on the side face 17. On this supporting section 29 there is again stacked, opposite the nozzles 18, a further supporting section 7 in which the second row of pressure chambers is provided. The jet nozzle ducts 6 emerging from the pressure chambers 2 provided in the supporting section 7 directly continue into further jet nozzle ducts 16 which themselves are provided in the supporting section 29 and which extend beyond the pressure chambers 2 provided on the supporting section 29.

The construction of the ink jet printing head shown in FIG. 10 is again similar to that shown in FIG. 8. However, in this case three supporting sections 1, 7 and 30 are provided instead of two supporting sections 1 and 7, all three supporting sections being stacked. Each of the supporting sections comprises two rows of consecutively arranged pressure chambers 2. In the supporting section 1 there are again provided further jet nozzle ducts 28 which adjoin the jet nozzle ducts 6 which emerge from the pressure chambers 2 provided on the supporting section 7. Because of the presence of a third supporting section 30, in the supporting section 7 there are provided further jet nozzle ducts 31 which adjoin the jet nozzle ducts 6 which emerge from the pressure chambers 2 provided on the supporting section 30. For the continuation of these further jet nozzle ducts 31, additional further jet nozzle ducts 32 are provided on the supporting section 1 in an analogous manner. Thus, all jet nozzle ducts 6 emerging from the pressure chambers 2 are continued as far as the adapter piece 15 which adjoins the supporting section 1 and in which they continue into further jet nozzle ducts 16 which themselves reach as far as the nozzles 18 on the side face 17 of the adapter piece 15. A particularly high packing density of the pressure chambers is thus achieved.

Evidently, similar to the ink jet printing head shown in the FIGS. 1 to 6, the jet nozzle ducts 6 which emerge from the pressure chambers 2 on the supporting sections 7 and 30 in this embodiment could also be passed through the nearer supporting sections 1 and 7, viewed in the stacking direction by means of corresponding extension pieces accommodating the jet nozzle ducts on these supporting section. It is in that case advantageous to make the extension pieces on the supporting section 30 so long that they extend through the supporting section 7 as well as through the supporting section 1 in corresponding bores, so that they reach directly as far as the adapter piece 15.

As appears from the foregoing, a variety of modifications of the described embodiments are feasible within the scope of the invention. It is to be noted especially that the number and the arrangement of the nozzles required and hence the number of pressure chambers required is not important within the context of the present invention, because the steps in accordance with the invention are also attractive in the case of a smaller number of nozzles and pressure chambers.

What is claimed is:

1. An ink jet printing head, which comprises at least one supporting section for a number of pressure chambers which communicate with an ink duct via supply ducts and the principal dimension of the base of which is substantially larger than their height, the pressure chambers being adjacently arranged in the supporting section, a jet nozzle duct emerging from each pressure chamber in order to supply ink to a nozzle which is situated opposite the pressure chambers, characterized in that there are provided at least two stacked supporting sections on which the pressure chambers are distributed so that they are staggered with respect to one another, the jet nozzle ducts which emerge from pressure chambers in the supporting section which is remote from the nozzles, viewed in the stacking direction, extending between the pressure chambers in the supporting section which is nearer to the nozzles, viewed in the stacking direction.

2. An ink jet printing head as claimed in claim 1, characterized in that the supporting sections are plate-shaped, the supporting section which is nearest to the nozzles being adjoined by an adapter piece in which further jet nozzle ducts are recessed to connect the jet nozzle ducts emerging from all pressure chambers to the nozzles.

3. An ink jet printing head as claimed in claim 2, characterized in that on the supporting section which is remote from the nozzles, viewed in the stacking direction, there is provided, corresponding to each pressure chamber and the jet nozzle duct emerging therefrom, a projecting extension piece which accommodates the relevant jet nozzle duct and which extends through a bore which is provided in the supporting section which is nearer to the jet nozzles, said extension piece reaching as far as the adapter piece.

4. A method of manufacturing an ink jet printing head as claimed in any of the preceding claims, characterized in that the finished supporting sections with the pressure chambers and the jet nozzle ducts emerging therefrom are placed in the stacked position in which they are subsequently arranged in a mould, the remaining clearance therein defining the shape of an adapter piece, after which one end of a wire-shaped or pin-shaped insert is introduced into each of the jet nozzle ducts emerging from the supporting sections, after which the other ends of the inserts extending through the clearance of the mould are fixed on the mould in the positions which correspond to the adjacently situated nozzles, the mould then being filled with a moulding compound and the inserts being removed after the setting of the compound.

* * * * *

UNITED STATES PATENT AND TRADEMARK OFFICE
CERTIFICATE OF CORRECTION

PATENT NO. : 4,455,560

DATED : June 19, 1984

INVENTOR(S) : FRIEDRICH LOUZIL

It is certified that error appears in the above-identified patent and that said Letters Patent is hereby corrected as shown below:

On the Title Page:

The "Assignee" and the "Attorney, Agent, or Firm" is missing

Please add --Assignee: U.S. Philips Corporation, New York, N.Y.-- and

--Attorney, Agent, or Firm-James J. Cannon,Jr.--

Signed and Sealed this

*Eleventh* Day of *February 1986*

[SEAL]

*Attest:*

DONALD J. QUIGG

*Attesting Officer* *Commissioner of Patents and Trademarks*